United States Patent
Kim et al.

(10) Patent No.: US 9,895,038 B2
(45) Date of Patent: Feb. 20, 2018

(54) AUTOMATIC CLEANER

(71) Applicant: LG Electronics Inc., Seoul (KR)

(72) Inventors: Jihwan Kim, Seoul (KR); Seaunglok Ham, Seoul (KR); Jongjin Woo, Seoul (KR); Hwang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 526 days.

(21) Appl. No.: 14/575,270

(22) Filed: Dec. 18, 2014

(65) Prior Publication Data
US 2015/0165498 A1 Jun. 18, 2015

(30) Foreign Application Priority Data
Dec. 18, 2013 (KR) .................. 10-2013-0157703

(51) Int. Cl.
| | | |
|---|---|---|
| *A47L 9/00* | (2006.01) | |
| *B60B 9/00* | (2006.01) | |
| *B60B 11/00* | (2006.01) | |
| *B25F 5/00* | (2006.01) | |
| *B60B 19/02* | (2006.01) | |
| *B60B 19/04* | (2006.01) | |

(Continued)

(52) U.S. Cl.
CPC .............. *A47L 9/009* (2013.01); *B25F 5/00* (2013.01); *B60B 19/02* (2013.01); *B60B 19/04* (2013.01); *A47L 11/4072* (2013.01); *A47L 2201/00* (2013.01); *B08B 13/00* (2013.01); *B60B 9/06* (2013.01); *B60B 9/10* (2013.01); *B60B 11/00* (2013.01); *B60B 15/021* (2013.01); *B60B 2200/49* (2013.01); *B60B 2900/351* (2013.01)

(58) Field of Classification Search
CPC ..... B60B 2200/49; B60B 19/10; B60B 19/12; B60B 11/00; B60B 11/02; B60B 15/021; B60B 15/26; A47L 9/009; A47L 2201/00; A47L 11/4072
See application file for complete search history.

(56) References Cited

U.S. PATENT DOCUMENTS

2005/0015912 A1* 1/2005 Kim .................... A47L 5/34
15/319
2008/0302586 A1* 12/2008 Yan .................... A47L 9/009
180/24.08

(Continued)

FOREIGN PATENT DOCUMENTS

| CN | 1216272 | 5/1999 |
|---|---|---|
| CN | 2426328 | 4/2001 |

(Continued)

OTHER PUBLICATIONS

European Search Report dated May 8, 2015.
Chinese Office Action dated Aug. 15, 2016 issued in Application No. 2014-10657728 (with English Transltion).

*Primary Examiner* — Laura C Guidotti
(74) *Attorney, Agent, or Firm* — Ked & Associates LLP (57) ABSTRACT

An automatic cleaner is provided. The automatic cleaner may include a main body, and a wheel assembly disposed in the main body to allow the main body to move. The wheel assembly may include a drive, a first wheel rotated by a power of the drive, and a second wheel rotated by the power of the drive. The second wheel may include a plurality of contact protrusions on an outer circumferential surface thereof.

18 Claims, 6 Drawing Sheets

(51) Int. Cl.
  *B08B 13/00* (2006.01)
  *A47L 11/40* (2006.01)
  *B60B 15/02* (2006.01)
  *B60B 9/06* (2006.01)
  *B60B 9/10* (2006.01)

(56) References Cited

U.S. PATENT DOCUMENTS

| | | | |
|---|---|---|---|
| 2012/0167917 | A1 | 7/2012 | Gilbert, Jr. |
| 2013/0081218 | A1* | 4/2013 | Kim .................. A47L 9/009 15/21.1 |
| 2013/0310978 | A1* | 11/2013 | Ozick ................ G05D 1/0231 700/258 |
| 2014/0060716 | A1* | 3/2014 | Windorfer ............. B60C 11/11 152/209.8 |

FOREIGN PATENT DOCUMENTS

| | | |
|---|---|---|
| CN | 2627977 | 7/2004 |
| CN | 1297224 | 1/2007 |
| CN | 102126400 | 7/2011 |
| CN | 103027633 | 4/2013 |
| EP | 2 561 784 | 2/2013 |
| FR | 2712316 | 5/1995 |
| JP | H07-079890 | 3/1995 |
| WO | WO 03/026474 | 4/2003 |

* cited by examiner

AUTOMATIC CLEANER

CROSS-REFERENCE TO RELATED APPLICATION(S)

The present application claims priority under 35 U.S.C. 119 and 35 U.S.C. 365 to Korean Patent Application No. 10-2013-0157703, filed in Korea on Dec. 18, 2013, which is hereby incorporated by reference in its entirety.

BACKGROUND

1. Field

An automatic cleaner is disclosed herein.

2. Background

In general, automatic cleaners are devices that suction in dust or foreign substances from a surface to be cleaned while automatically traveling along the surface. Such an automatic cleaner may include a casing that defines an exterior thereof. A moving device having a plurality of wheels to move a main body may be disposed in the casing. A portion or all of the plurality of wheels may be formed of a rubber material to increase a friction force with respect to the surface.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to embodiments, examples of which are illustrated in the accompanying drawings. Where possible, like reference numerals have been used to indicate like elements, and repetitive disclosure has been omitted.

In the following detailed description of embodiments, reference is made to the accompanying drawings that form a part hereof, and in which is shown by way of illustration specific embodiments. These embodiments are described in sufficient detail to enable those skilled in the art to practice, and it is understood that other embodiments may be utilized and that logical structural, mechanical, electrical, and chemical changes may be made without departing from the spirit or scope. To avoid detail not necessary to enable those skilled in the art to practice, the description may omit certain information known to those skilled in the art. The following detailed description is, therefore, not to be taken in a limiting sense.

Also, in the description of embodiments, terms such as first, second, A, B, or (a), (b) may be used herein when describing components. Each of these terminologies is not used to define an essence, order or sequence of a corresponding component, but rather, is used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
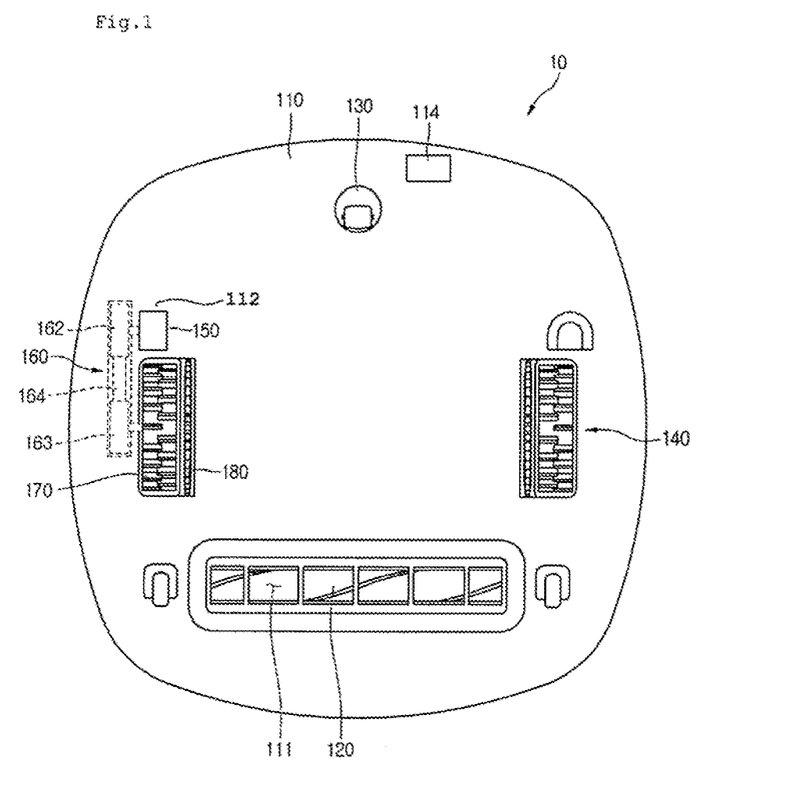
FIG. 1 is a bottom view of an automatic cleaner according to an embodiment.
Figure 2:
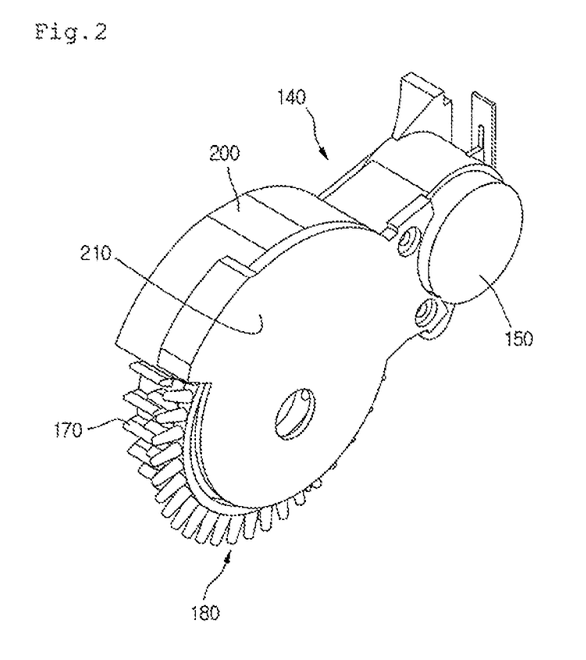
FIG. 2 is a perspective view of a wheel assembly according to an embodiment.
Figure 3:
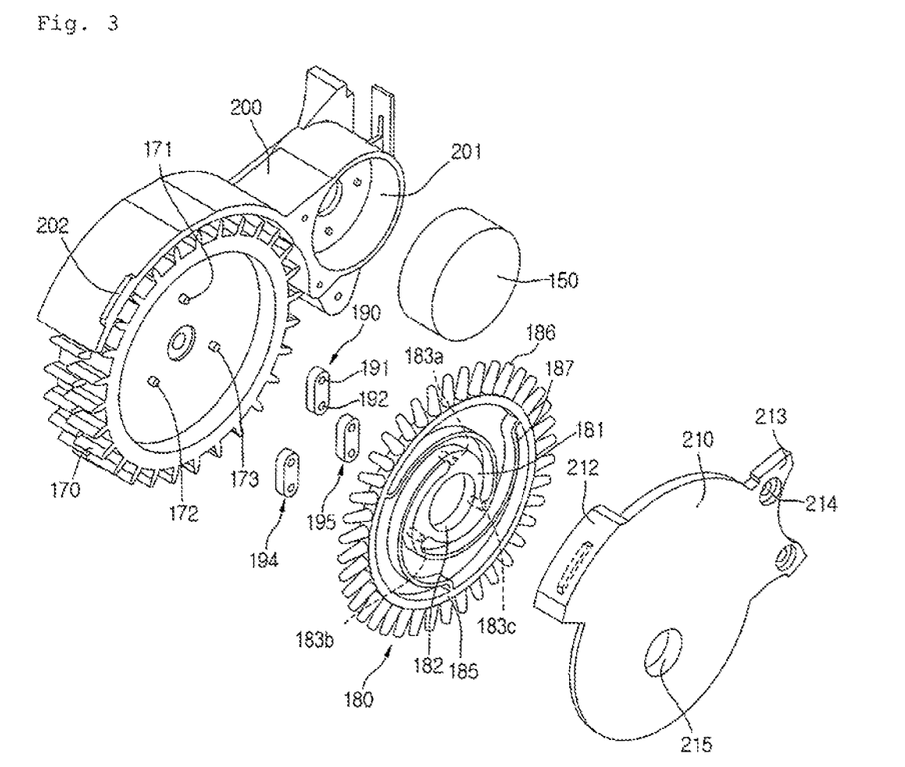
FIG. 3 is an exploded perspective view of the wheel assembly of FIG. 2.

FIG. 1 is a bottom view of an automatic cleaner according to an embodiment. FIG. 2 is a perspective view of a wheel assembly according to an embodiment. FIG. 3 is an exploded perspective view of the wheel assembly of FIG. 2.

Referring to FIGS. 1 to 3, an automatic cleaner 10 according to an embodiment may include a main body 110 that defines an exterior thereof. Various components may be disposed in the main body 110. For example, a suction motor (not shown) to suction in foreign substances and a dust collection unit or device (not shown) to store the suctioned in foreign substances may be disposed in the main body 110.

A suction hole 111 may be defined in a bottom surface of the main body 110. The suction hole 111 may function as an inlet through which foreign substances may be suctioned into the main body 110, substantially, the dust collection unit by the suction motor. The suction hole 111 may be formed, for example, by cutting a portion of the bottom surface of the main body 110.

A brush 120 may be disposed at a position corresponding to the suction hole 111 of the main body 110. The brush 120 may pass through the suction hole 111 to contact the foreign substances on the bottom surface, thereby removing the foreign substances. A portion of the brush 120 may be rotatably disposed on the main body 110 in a state in which the portion of the brush 120 may be exposed downward through the suction hole 111.

The main body 110 may further include a plurality of wheel assembles 140 to move the main body 110. For example, the plurality of wheel assemblies 140 may be disposed to be spaced apart from each other in a left/right or lateral direction of the main body 10.

Each of the plurality of wheel assembles 140 may include a driving part or drive 150, a first transmission part or transmission 160 connected to the driving part 150, a first wheel 170 connected to the first transmission part 160 to receive a power of the driving part 150, a second wheel 180 rotated together with the first wheel 170, and a second transmission part or transmission to transmit the rotational force of the first wheel 170 to the second wheel 180. The driving part 150 may be accommodated in a housing 200.

An opening 112, through which the first wheel 170 and the second wheel 180 may pass, may be defined in the main body 110. Each of the wheels 170 and 180 may pass through the opening 112 to contact a surface to be cleaned (hereinafter, referred to as a "cleaning surface").

The plurality of driving parts 150 for the plurality of wheel assembles 140 may be independently controlled by a control part or controller (not shown). Each of the plurality of driving parts 150 may include a bidirectionally rotatable motor, for example.

The first transmission part 160 may include a first pulley 162 connected to the driving part 150, a second pulley 163 connected to the first wheel 170, and a belt 164 wound around each of the first and second pulleys 162 and 163. Alternatively, the power of the driving part 150 may be transmitted to the first wheel 170 by at least one gear, or the driving part 150 may be directly connected to the first wheel 170. That is embodiments are not limited to a structure of the first transmission part 160, and also, the first transmission part 160 may be omitted.

The housing 200 may be supported by an elastic member (not shown). The elastic member may provide an elastic force to move the housing 200 toward a lower side of the main body 110.

Thus, when the main body 110 is disposed on the cleaning surface, the elastic member may be compressed by a repulsive force of the cleaning surface. On the other hand, when a front portion of the main body 110 is lifted by an obstacle, such as a door sill, the housing 200 may move downward by the elastic force of the elastic member, and thus, each of the wheels 170 and 189 may move downward. As the structure to vertically move the wheel assembly 140 in the this embodiment is realized by well-known technology, detailed descriptions thereof have been omitted.

A portion or all of the first wheel 170 may be formed of a rubber material. Alternatively, the first wheel 170 may include a body and a wheel cover coupled to an outside of an body and formed of a rubber material.

The second wheel 180 may include a first body 181, a second body 185 disposed outside of an outer circumferential surface of the first body 181 and spaced apart from the first body 181, and at least one connection part or portion 187 that connects the first body 181 to the second body 185. For example, FIG. 3 illustrates a structure in which a plurality of connection parts 187 connect the first body 181 to the second body 185.

The second wheel 189 may have a thickness less than a thickness of the first wheel 170. The second body 185 may have a ring shape. The first body 181 may be disposed inside the second body 185.

A hole 182 connected to a cover member 210, which will be described hereinbelow, may be defined in the first body 181. The hole 182 may improve a strength of the first body 181.

The plurality of connection parts 187 may connect an outer circumferential surface of the first body 181 to an inner circumferential surface of the second body 185 in a state in which the plurality of connection parts 187 are spaced apart from each other. The plurality of connection parts 187 may connect the two bodies 181 and 185 to each other in a state in which each of the plurality of connection parts 187 is rounded or bent, that is, as illustrated in FIG. 3, may radially extend from the outer circumferential surface of the first body 181, that is, may be rounded to radially extend.

Thus, in this embodiment, as the first and second bodies 181 and 185 may be connected to each other by the plurality of connection parts 187, the second body 185 may be elastically deformed with respect to the first body 181. That is, if an external force is not applied to the second wheel 180, a center of the first body 181 may coincide with a center of the second body 185. On the other hand, if an external force is applied to the second wheel 180, the center of the first body 181 may not coincide with the center of the second body 185. The center of the first body 181 may be a rotational center C1, which will be described later.

A plurality of contact protrusions 186 that contact the cleaning surface may be disposed on an outer circumferential surface of the second body 185. The plurality of contact protrusions 186 be spaced a predetermined distance from each other to radially extend from the outer circumferential surface of the second body 185.

The plurality of contact protrusions 186 may gradually decrease in thickness or diameter in a direction away from the outer circumferential surface of the second body 185. Alternatively, each of the plurality of contact protrusions 186 may have a thickness or diameter that gradually decreases in the direction away from the outer circumferential surface of the second body 185. An end of each of the contact protrusions 186 may be rounded to minimize damage to the cleaning surface when the end contacts the cleaning surface.

The second transmission part may include a plurality of first protrusions 171 to 173 that protrudes from the first wheel 170, a plurality of second protrusions 183a to 183c that protrudes from the first body 181 of the second wheel 180, and a plurality of links 190, 194, and 195, each of which may be connected to one of the plurality of first protrusions 171, 172, 173 and one of the plurality of second protrusions 183a, 183b, 183c. In this embodiment, the plurality of first protrusions 171, 172, 173, the plurality of second protrusions 183a, 183b, 183c, and the plurality of links 190, 194, 195 have a same number.

The plurality of first protrusions 171 to 173 may be disposed to be spaced apart from each other. For example, virtual lines that connect the plurality of first protrusions 171 to 173 to each other may have a triangular shape.

The plurality of second protrusions 183a to 183c may be disposed to be spaced apart from each other. For example, virtual lines that connect the plurality of second protrusions 183a to 183c to each other may have a triangular shape.

Also, a distance between the plurality of first protrusions 171 to 173 may be equal to a distance between the plurality of second protrusions 183a to 183c. That is, the virtual lines that connects the plurality of first protrusions 171 to 173 to each other may have an equilateral triangular shape, and the virtual lines that connect the plurality of second protrusions 183a to 183c to each other may have an equilateral triangular shape. The two equilateral triangular shapes may have a same size.

Although three first protrusions and three second protrusions are provided in FIG. 3, embodiments are not limited to the number of first and second protrusions. However, a plurality of each of the first and second protrusions may be provided so that the rotational force of the first wheel 170 is smoothly transmitted to the second wheel 180. Also, each of the virtual lines that connect the plurality of first protrusions 171, 172, 173 to each other and the virtual lines that connect the plurality of second protrusions 183a, 183b, 183c to each other may have a polygonal shape.

The plurality of links 190, 194, and 195 may have first protrusion holes 191, in which the first protrusions 171 to 173 may be inserted and second protrusion holes 192, in which the second protrusions 183a to 183c may be inserted, respectively. The first protrusion hole 191 and the second protrusion hole 192 are spaced apart from each other.

Although the protrusions are disposed on each of the wheels 170 and 180, and the plurality of protrusion holes 191, 192 are defined in the links 190, 194, and 195 in this embodiment, embodiments are not limited thereto. For example, the plurality of protrusions may be disposed on the links 190, 194, and 195, and the holes, in which the protrusions may be inserted, may be defined in each of the wheels 170 and 180.

Alternatively, the protrusion may be disposed on one of the first and second wheels 170 and 180, and the protrusion hole may be defined in the other of the first and second wheels 170 and 180. Also, the protrusion and the protrusion hole may be provided on or in each of the links 190, 194, and 195.

The housing 200 may include an accommodation part or portion 201 to accommodate the driving part 150. The housing 200 may further include a coupling rib 202 coupled to the cover member 210, which will be described hereinbelow.

The wheel assembly 140 may include the cover member 210 to cover a portion of an outside of the second wheel 180. The cover member 210 may be coupled to the housing 200 in a state in which the cover member 210 covers the second wheel 180. The cover member 210 may include a rib accommodation part or portion 212 having an accommodation groove to accommodate the coupling rib 202 of the housing 200.

The cover member 210 may further include a coupling part or portion 213 having a coupling hole 214 coupled to the housing 200 using a coupling member (not shown), for example. Thus, in the state in which the coupling rib 202 of the housing 200 is accommodated in the rib accommodation part 212 of the cover member 210, when the coupling member 213 is coupled to the housing 200 using the coupling member, the cover member 210 may be fixed to the housing 200.

An insertion part or portion 215 inserted into the hole 182 defined in the first body 180 of the second wheel 180 may be disposed on the cover member 210. An outer circumferential surface of the insertion part 215 may contact an inner circumferential surface of the hole 182.

Thus, the first body 181 of the second wheel 180 may rotate along a circumference of the insertion part 215. That is, the insertion part 215 may serve as a shaft to rotate the first body 181 and guide rotation of the first body 181. Alternatively, the hole may be defined in the cover member 210, and the insertion part inserted into the hole may be disposed on the first body 181.

In the state in which the plurality of wheel assemblies 140 are installed on the automatic cleaner, a distance between the plurality of second wheels 180 may be less than a distance between the plurality of first wheels 170. That is, the first wheels 170 may be disposed outside of the second wheels 180. Thus, damage to the second wheels 180 due to an obstacle while the automatic cleaner travels may be minimized.

An auxiliary wheel 130 for easy moving of the main body 110 may be disposed on at least one of a front side or a rear side of the wheel assembly 140 on the main body 110 with respect to an advancing direction of the main body 110. Also, a bottom detection sensor 114 may be disposed on or at front side of the wheel assembly 140 on the main body 110. The control unit may control the driving part 150 on the basis of information detected by the bottom detection sensor 114.

Figure 4:
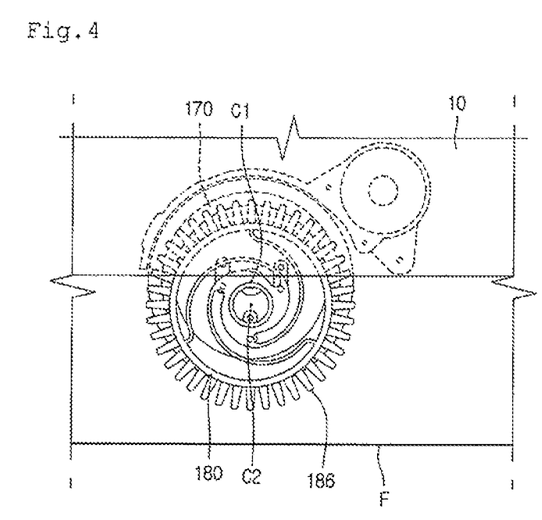
FIG. 4 is a side view of the wheel assembly of FIG. 2 in a state in which the automatic cleaner is lifted from a surface to be cleaned.
Figure 5:
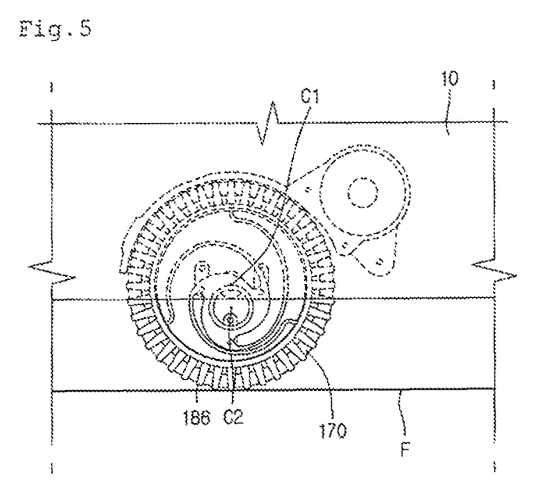
FIG. 5 is a side view of the wheel assembly of FIG. 2 when the automatic cleaner is located on a flat surface to be cleaned.
Figure 6:
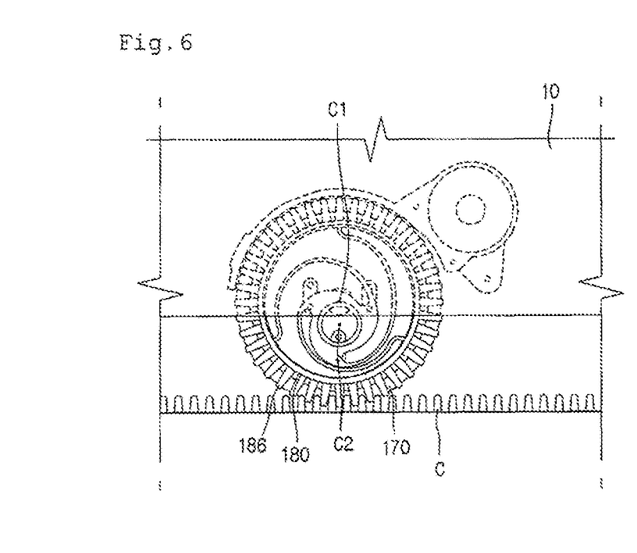
FIG. 6 is a side view of the wheel assembly when the automatic cleaner is located on a surface to be cleaned, such as a carpet.

FIG. 4 is a side view of the wheel assembly of FIG. 2 in a state in which the automatic cleaner is lifted from a surface to be cleaned. FIG. 5 is a side view of the wheel assembly when the automatic cleaner of FIG. 2 is located on a flat surface to be cleaned. FIG. 6 is a side view of the wheel assembly when the automatic cleaner is located on a surface to be cleaned, such as a carpet.

Referring to FIG. 4, when the automatic cleaner is lifted from a cleaning surface F, that is, in a state in which an external force is not applied to the second wheel 180, a rotational center C2 of the second wheel 180 may be lower than a rotational center C1 of the first wheel 170. A distance between the rotational center C1 of the first wheel 170 and the rotational center C2 of the second wheel 180 may be constantly maintained regardless of a state of the cleaning surface on which the automatic cleaner is disposed. When the automatic cleaner is lifted from the cleaning surface, a lowest point of the second wheel 180 may be lower than a lowest point of the first wheel 170.

Referring to FIG. 5, when the automatic cleaner is disposed on a flat cleaning surface F, a repulsive force of the cleaning surface F may be transmitted to the plurality of connection parts 187 of the second wheel 180. Thus, the plurality of connection parts 187 may be elastically deformed to allow the first and second wheels 170 and 180 to contact the cleaning surface F.

Also when the automatic cleaner is disposed on the flat cleaning surface F, the center of the first body 181 may be fixed, and the center of the second body 185 may move upward. That is, the centers of the first and second bodies 181 and 185, may not coincide with each other.

In the state of FIG. 5, when the driving part 150 operates, the first wheel 170 may be rotated by the driving part 150. Thus, the rotational force of the first wheel 170 may be transmitted to the second wheel 180 to rotate together the second wheel 180. When the automatic cleaner is disposed on the flat cleaning surface F, the first wheel 170 may contact the cleaning surface F, and thus, the automatic cleaner may smoothly move without sliding on the cleaning surface F.

Referring to FIG. 6, when the automatic cleaner is disposed on a cleaning surface, such as a carpet C, a repulsive force of the carpet C may be transmitted to the plurality of connection parts 187 of the second wheel 180. Thus, the plurality of connection parts 187 may be elastically deformed to allow the first and second wheels 170 and 180 to contact the carpet C.

Also, when the automatic cleaner is disposed on the carpet C, the center of the first body 181 may be fixed, and the center of the second body 185 may move upward. That is the centers of the first and second bodies 181 and 185 may not coincide with each other.

A portion of the plurality of contact protrusions 186 disposed on the second wheel 180 may be embedded in the carpet C. Thus, the lowest point of the second wheel 180 may be lower than the lowest point of the first wheel 170.

Thus, even when the first wheel 170 contacts the carpet C, the second wheel 180 may rotate in a state in which the portion of the contact protrusions 186 of the second wheel 180 is embedded in the carpet C. Thus, the automatic cleaner may smoothly move on the carpet C without sliding. That is, the plurality of contact protrusions 186 of the second wheel 180 may serve as spikes.

Thus, a difference between a position on a map of the automatic cleaner and an actual position may be prevented from occurring, and the automatic cleaner may accurately move to a charging device.

Although each of the wheel assembles includes the first and second wheels in the previous embodiment, one of the plurality of wheel assembles may include the first and second wheels.

Also, although the second wheel receives the rotational force of the first wheel to operate, embodiments are not limited thereto. For example, the second wheel may not be connected to the first wheel. That is, the second wheel may be directly connected to the driving part or indirectly connected to the driving part by an additional transmission part to receive the power of the driving part.

Alternatively, the second wheel may not receive the rotational force of the first wheel, but rather, may be rotated by a separate driving part or drive. That is, the first driving part may drive the first wheel, and the second driving part may drive the second wheel. In this case, at least one second wheel may be disposed on the main body. In such a case, a relationship between the rotational centers of the first and second wheels may be applied and maintained as described above.

Alternatively, the second wheel may be driven by the separate driving part, and the rotational center of the first wheel may have a same height as a height of the rotational center of the second wheel. However, the second wheel may have a diameter greater than a diameter of the first wheel.

Embodiments disclosed herein provide an automatic cleaner.

Embodiments disclosed herein provide an automatic cleaner that may include a main body; and a wheel assembly disposed in the main body to allow the main body to move. The wheel assembly may include a driving part or drive; a first wheel rotating by a power of the driving part; and a second wheel rotating by the power of the driving part. The second wheel may include a plurality of contact protrusions on an outer circumferential surface thereof.

Embodiments disclosed herein further provide an automatic cleaner that may include a main body; a plurality of first wheels disposed in the main body to allow the main body to move; a plurality of driving parts or drives to drive each of the plurality of first wheels; and a second wheel disposed between the plurality of first wheels to rotate by a power of one of the plurality of driving parts. The second wheel may include a plurality of contact protrusions on an outer circumferential surface thereof.

Embodiments disclosed herein further provide an automatic cleaner that may include a main body; a plurality of first wheels disposed in the main body to allow the main body to move; a plurality of first driving parts or drives to drive the plurality of first wheels, respectively; a second wheel disposed in the main body to allow the main body to move; and a second driving part or drive to drive the second wheel. The second wheel may be deformable by an external force and may include a plurality of contact protrusions on an outer circumferential surface thereof.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An automatic cleaner, comprising:
    a main body; and
    at least one wheel assembly disposed in the main body to allow the main body to move, wherein at least one wheel assembly comprises:
        a drive;
        a first wheel rotated by a power of the drive; and
        a second wheel rotated by the power of the drive, wherein the second wheel includes a plurality of contact protrusions on an outer circumferential surface thereof, wherein in a state in which the main body is lifted, a lowest point of the second wheel is lower than a lowest point of the first wheel.

2. The automatic cleaner according to claim 1, wherein the second wheel is elastically deformed by an external force, and wherein the plurality of contact protrusions radially extends from the outer circumferential surface of the second wheel.

3. The automatic cleaner according to claim 2, wherein the plurality of contact protrusions gradually decreases in thickness or diameter in a direction away from the outer circumferential surface of the second wheel.

4. The automatic cleaner according to claim 2, wherein the second wheel comprises:
    a first body;
    a second body disposed outside of an outer circumferential surface of the first body; and
    at least one connection portion that connects the first body to the second body, wherein the at least one connection portion is elastically deformable, and wherein the plurality of contact protrusions is disposed on an outer circumferential surface of the second body.

5. The automatic cleaner according to claim 4, wherein the at least one connection portion connects an outer circumferential surface of the first body to an inner circumferential surface of the second body and is rounded to radially extend from the outer circumferential surface of the first body.

6. The automatic cleaner according to claim 4, wherein, when an external force is not applied to the second wheel, a center of the first body coincides with a center of the second body, and when an external force is applied to the second wheel, the center of the second body moves and does not coincide with the center of the first body.

7. The automatic cleaner according to claim 4, wherein the at least one wheel assembly further comprises a transmission to transmit a rotational force of the first wheel to the second wheel.

8. The automatic cleaner according to claim 7, wherein the transmission comprises:
    a plurality of protrusions, which are disposed on each of the first and second wheels, and
    a plurality of links having a plurality of grooves into which the plurality of protrusions of each of the wheels is inserted.

9. The automatic cleaner according to claim 8, wherein virtual lines that connect the plurality of protrusions disposed on each of the first and second wheels to each other have a polygonal shape.

10. The automatic cleaner according to claim 4, wherein a rotational center of the second wheel is lower than a rotational center of the first wheel.

11. The automatic cleaner according to claim 4, wherein the at least one wheel assembly further comprises:
a cover member to cover the second wheel; and
a housing to which the cover member is coupled, wherein a hole is defined in one of the cover member or the first body, and an insertion portion inserted into the hole is disposed on the other of the cover member or the first body.

12. The automatic cleaner according to claim 1, wherein the at least one wheel assembly further comprises:
a first transmission to transmit the power of the drive to the first wheel; and
a second transmission to transmit the power of the drive to second wheel.

13. The automatic cleaner according to claim 1, wherein a plurality of first wheels is disposed in the main body, and wherein the second wheel is disposed between the plurality of first wheels.

14. An automatic cleaner, comprising:
a main body;
a plurality of first wheels disposed in the main body to allow the main body to move;
a plurality of drives to drive each of the plurality of first wheels; and
a second wheel disposed between the plurality of first wheels and rotated by a power of one of the plurality of drives, wherein the second wheel comprises a plurality of contact protrusions on an outer circumferential surface thereof, and wherein a rotational center of the second wheel is lower than a rotational center of the first wheel.

15. The automatic cleaner according to claim 14, wherein the second wheel is elastically deformable by an external force.

16. The automatic cleaner according to claim 14, wherein the second wheel comprises:
a first body;
a second body disposed outside of an outer circumferential surface of the first body; and
at least one connection portion that connects the first body to the second body, wherein the at least one connection portion is elastically deformable, and wherein the plurality of contact protrusions is disposed on the outer circumferential surface of the second body.

17. The automatic cleaner according to claim 14, further comprising a transmission to transmit a rotational force of one of the plurality of first wheels to the second wheel.

18. An automatic cleaner, comprising:
a main body;
a plurality of first wheels disposed in the main body to allow the main body to move;
a plurality of first drives to drive the plurality of first wheels, respectively;
a second wheel disposed in the main body to allow the main body to move; and
a second drive to drive the second wheel, wherein the second wheel is deformable by an external force and comprises a plurality of contact protrusions on an outer circumferential surface thereof, wherein the second wheel comprises:
a first body;
a second body disposed outside of an outer circumferential surface of the first body; and
at least one connection portion that connects the first body to the second body, wherein the at least one connection part is elastically deformable, and wherein the plurality of contact protrusions is disposed on the outer circumferential surface of the second body.

* * * * *